(12) United States Patent
Ji et al.

(10) Patent No.: US 11,005,229 B2
(45) Date of Patent: May 11, 2021

(54) ALL SOLID-STATE LASER LIGHT SOURCE DEVICE

(71) Applicant: HAN'S LASER TECHNOLOGY INDUSTRY GROUP CO., LTD., Guangdong (CN)

(72) Inventors: Encai Ji, Shenzhen (CN); Qitao Lv, Shenzhen (CN); Yunfeng Gao, Shenzhen (CN)

(73) Assignee: HAN'S LASER TECHNOLOGY INDUSTRY GROUP CO., LTD., Guangdong (CN)

( * ) Notice: Subject to any disclaimer, the term of this patent is extended or adjusted under 35 U.S.C. 154(b) by 0 days.

(21) Appl. No.: 16/644,771

(22) PCT Filed: Dec. 5, 2017

(86) PCT No.: PCT/CN2017/114548
§ 371 (c)(1),
(2) Date: Mar. 5, 2020

(87) PCT Pub. No.: WO2019/109235
PCT Pub. Date: Jun. 13, 2019

(65) Prior Publication Data
US 2021/0083448 A1  Mar. 18, 2021

(51) Int. Cl.
| | | |
|---|---|---|
| *H01S 3/13* | (2006.01) |
| *H01S 3/131* | (2006.01) |
| *H01S 3/094* | (2006.01) |
| *H01S 3/16* | (2006.01) |
| *H01S 3/0941* | (2006.01) |

(52) U.S. Cl.
CPC ........ *H01S 3/1312* (2013.01); *H01S 3/09415* (2013.01); *H01S 3/094053* (2013.01);
(Continued)

(58) Field of Classification Search
CPC .......... H01S 3/094053; H01S 3/09415; H01S 3/161; H01S 3/1653; H01S 3/1673;
(Continued)

(56) References Cited

U.S. PATENT DOCUMENTS 6,429,965 B1 * 8/2002 Falquier ............ H01S 3/06754
                                                     359/341.1
8,582,613 B1 * 11/2013 Kim ...................... H01S 3/1675
                                                        372/25
(Continued)

FOREIGN PATENT DOCUMENTS

| CN | 101247019 A | 8/2008 |
| CN | 102299469 A | 12/2011 |

(Continued)

OTHER PUBLICATIONS

International Search Report dated Dec. 13, 2018 in the parent application PCT/CN2017/114548 (2 pages).
(Continued)

*Primary Examiner* — Kinam Park
(74) *Attorney, Agent, or Firm* — Polsinelli PC

(57) ABSTRACT

An all solid-state laser light source device comprises a diode-pump laser and the following devices sequentially arranged in an optical path direction of laser light: a coupling optical fiber, a coupling lens assembly, and a resonant cavity. An anisotropic laser crystal is provided in the resonant cavity. Absorption spectra of the anisotropic laser crystal comprise a π polarization absorption spectrum and a σ polarization absorption spectrum. Each of the π polarization absorption spectrum and the σ polarization absorption spectrum has a peak pump region and a left pump region and a right pump region arranged on either side of the peak pump
(Continued)

region. Pump light outputted by diode-pump laser has a wavelength λ falling within the left pump region or the right pump region.

10 Claims, 2 Drawing Sheets

(52) U.S. Cl.
CPC ............ *H01S 3/1306* (2013.01); *H01S 3/161* (2013.01); *H01S 3/1653* (2013.01); *H01S 3/1608* (2013.01); *H01S 3/1611* (2013.01); *H01S 3/1618* (2013.01); *H01S 3/1673* (2013.01)

(58) Field of Classification Search
CPC .... H01S 3/1608; H01S 3/1611; H01S 3/1618; H01S 3/1306; H01S 3/1312
See application file for complete search history.

(56) References Cited

U.S. PATENT DOCUMENTS

| | | | |
|---|---|---|---|
| 2009/0237661 A1 | 9/2009 | Yamazoe | |
| 2012/0069864 A1* | 3/2012 | Weichmann | H01S 3/09415 372/75 |

FOREIGN PATENT DOCUMENTS

| | | |
|---|---|---|
| CN | 102449862 A | 5/2012 |
| CN | 103414100 A | 11/2013 |
| CN | 103576332 A | 2/2014 |
| CN | 104201551 A | 12/2014 |

OTHER PUBLICATIONS

Assion et al., "Coherent control by a single phase shaped femtosecond laser pulse", Chemical Physics Letters 259, pp. 488-494, (1996).

Czeranowsky et al., "Continuous wave diode pumped intracavity doubled ND : GdVO$_4$ laser with 840 mW output power at 456 nm", Optics Communications 205, pp. 361-365, (2002).

Kränkel et al., "Continuous wave laser operation of Yb$^3$+:YVO$_4$", Applied Physics B, 79, pp. 543-546, (2004).

Urata et al., "808-nm diode-pumped continuous-wave Tm:GdVO$_4$ laser at room temperature", Applied Optics, vol. 44, No. 15, pp. 3087-3092, May 20, 2005.

Chinese Office Action dated Sep. 28, 2020 issued in corresponding Patent Application No. 201780091167.5 (8 pages).

* cited by examiner

ALL SOLID-STATE LASER LIGHT SOURCE DEVICE

CROSS-REFERENCE TO THE RELATED APPLICATIONS

This application is a National Phase of International Application No. PCT/CN2017/114548, filed on Dec. 5, 2017, entitled ALL SOLID-STATE LASE LIGHT SOURCE DEVICE, the contents of which are expressly incorporated by reference herein in its entirety.

TECHNICAL FIELD

The present disclosure relates to the field of laser light source technologies, and in particular, to an all-solid-state laser light source device.

BACKGROUND

In a most widely applied all-solid-state laser pumped by optical fiber-coupled semiconductor laser, linear polarization laser output is obtained directly from anisotropic crystal with a direction cut. The wavelength λ of pump light is tuned to near the wavelength corresponding to the maximum absorption cross section of laser crystal to obtain the highest conversion efficiency.

In the optical fiber-coupled output semiconductor laser, especially when non-polarization-maintaining optical fibers are used to couple the pumped fibers, the polarization state of the pump light will be changed from linear polarization to random polarization distribution, and the intensity component in the orthogonal polarization direction will change along with the fiber winding mode. Considering that the anisotropic laser crystal has a significant difference in the absorption characteristics of the orthogonal polarization at the absorption peak, the intensity disturbance of the polarization component of the pump light will be reflected in the absorption efficiency of the pump light and eventually resulting that the stability of the output laser being compromised.

In a high-power laser system with low laser power stability requirement, it is usually satisfactory only to reduce the disturbance of pump absorption by fastening the coupled optical fiber. However, in a low-power laser system with high laser power stability requirement, the laser output stability cannot be improved only by fastening the optical fiber position, and the soft optical fiber medium is vulnerable to environmental disturbance.

SUMMARY

Therefore, it is necessary to provide an all-solid-state laser light source device which is insensitive to the polarization state of the pump light.

An all-solid-state laser light source device includes: a semiconductor pump laser, a coupling optical fiber, a coupling lens group, and a resonant cavity, the coupling optical fiber, the coupling lens group, and the resonant cavity are arranged in sequence along an optical path of laser; the resonant cavity is provided with an anisotropic laser crystal therein, an absorption spectrum of the anisotropic laser crystal includes a π polarization direction absorption spectrum and a σ polarization direction absorption spectrum, wherein the π polarization direction absorption spectrum and the σ polarization direction absorption spectrum have a peak pump region, and a left-wing pump region or a right-wing pump region located on both sides of the peak pump region, and a pump light wavelength λ outputted by the semiconductor pump laser is located in the left-wing pump region or the right-wing pump region.

In an embodiment, the resonant cavity is a flat cavity, a flat concave cavity, a folded cavity, an annular cavity, or an unstable cavity.

In an embodiment, the matrix material of the anisotropic laser crystal is $YVO_4$, $YLiF_4$, $YAlO_3$, or $KGd\,(WO_4)$.

In an embodiment, the doped ions of the anisotropic laser crystal are $Yb^{3+}$, $Nd^{3+}$, $Er^{3+}$, $Tm^{3+}$, or $Ho^{3+}$ ions.

In an embodiment, the anisotropic laser crystal is a Ho: YLF crystal formed by cutting along an a axis direction.

In an embodiment, a doping concentration of $Ho^{3+}$ in the Ho: YLF crystal is 0.5%.

In an embodiment, the Ho: YLF crystal has a length of 2 cm and a cross-sectional dimension of 4 mm×4 mm.

In an embodiment, the pump light wavelength λ outputted by the semiconductor pump laser is 1905 nm.

In an embodiment, the semiconductor pump laser is in optical communication with the coupling lens group through the coupling optical fiber, such that the pump light outputted from the semiconductor pump laser is coupled through the coupling optical fiber and then inputted into the coupling lens group.

In an embodiment, a linewidth of the pump light is less than 2 nm.

The present disclosure provides an all-solid-state laser light source device. The pump light output from the semiconductor pump laser has an equal absorption cross-sectional area in the two polarization directions of the anisotropic laser crystal, such that the output power does not fluctuate along with the variation of the polarization state, such that σ polarization-insensitive laser output is realized, and the laser output stability is improved.

BRIEF DESCRIPTION OF THE DRAWINGS

To describe the technical solutions in the embodiments of this disclosure or in the prior art more clearly, the following briefly introduces the accompanying drawings required for describing the embodiments or in the prior art. Apparently, the accompanying drawings in the following description are merely some embodiments of this disclosure, and persons of ordinary skill in the art may still derive other drawings from these accompanying drawings without creative efforts.

DETAILED DESCRIPTION OF THE EMBODIMENTS

Figure 1:
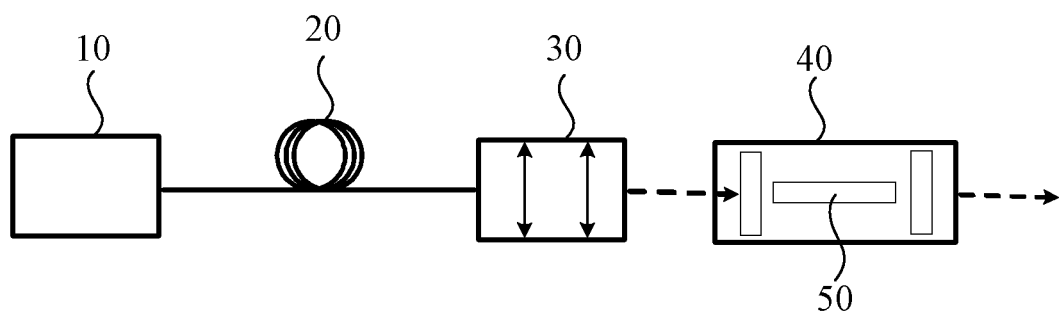
FIG. 1 is a schematic diagram of an all-solid-state laser light source device according to an embodiment.

To facilitate the understanding of the present disclosure, the all solid-state laser light source device will be described in more detail below with reference to the relevant accompanying drawings. The preferred embodiment of the all-solid-state laser light source device is shown in the drawing. However, all-solid-state laser light source devices may be implemented in many different forms and are not limited to the embodiments described herein. On the contrary, the purpose of providing these embodiments is to make the disclosure of all-solid-state laser light source devices more thorough and comprehensive.

Unless otherwise defined, all technical and scientific terminology used herein shall have the same meaning as is commonly understood by those skilled in the art of the present disclosure. The terminology used in the specification of an all-solid-state laser light source device is merely intended to describe specific embodiments and is not intended to limit the present disclosure. The term "and/or" used herein includes any and all combinations of one or more associated listed items.

Figure 2:
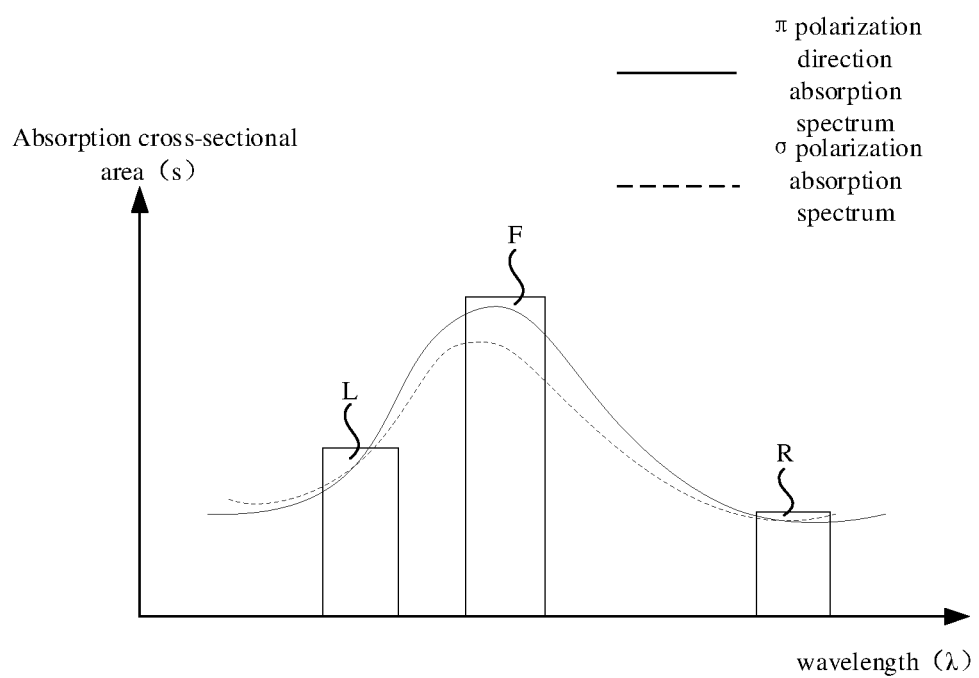
FIG. 2 is an absorption spectrum of the anisotropic laser crystal shown in FIG. 1.

As shown in FIG. 1 and FIG. 2, an all-solid-state laser light source device according to an embodiment includes a semiconductor pump laser 10, a coupling optical fiber 20, a coupling lens group 30, and a resonant cavity 40. The coupling optical fiber 20, the coupling lens group 30, and the resonant cavity 40 are disposed in sequence along an optical path direction of laser. The resonant cavity 40 is provided with an anisotropic laser crystal 50 therein; an absorption spectra of anisotropic laser crystal 50 include a π polarization direction absorption spectrum and a σ polarization direction absorption spectrum. The π polarization direction absorption spectrum and the σ polarization direction absorption spectrum have a peak pump region F and a left-wing pump region L or a right-wing pump region R located on both sides of the peak pump region F. A pump wavelength λ outputted by the semiconductor pump laser 10 is located in the left-wing pump region L or the right-wing pump region R.

In the foregoing implementation, when the pump wavelength λ is located in the left-wing pump region L or the right-wing pump region R, the absorption cross-sectional area of the anisotropic laser crystal 50 in the π polarization direction differs little from the absorption cross-sectional area in the σ polarization direction, that is, the sensitivity of the pump light to the polarization state is low, and the output power variation caused by the change of the pump light polarization state is overcome. Therefore, the influence on the output power by changing the winding mode of the coupling optical fiber 20 is minor, thus improving the anti-disturbance performance of the laser source device, realizing a stable output of the laser, and obtaining a pump polarization-insensitive all-solid-state laser generato.

In an embodiment, the resonant cavity 40 is a flat cavity, a flat concave cavity, a folded cavity, an annular cavity, or an unstable cavity. The pump light is tuned by the resonant cavity 40 such that the wavelength λ of the pump light is located in the left-wing pump region L or the right-wing pump region R, such that the output power of the pump light varies slightly in the π polarization direction and a polarization direction of the pump light That is, the pump light tuned is insensitive to polarization, thus when the soft optical fiber is vulnerable to environmental disturbance, the laser can still be outputted stably. In addition, as the pump wavelength λ is located in the left-wing pump region L or the right-wing pump region R, that is, the peak pump region F is avoided, the penetration depth of the pump light in the anisotropic laser crystal 50 is greater, such that the thermal distribution of the anisotropic laser crystal 50 is better and the adverse effect of thermal effect on the anisotropic laser crystal 50 is alleviated.

It should be noted that in the foregoing embodiment, when the pump wavelength λ outputted from the semiconductor pump laser 10 is tuned in the right-wing pump region R, for the in-band pump laser, the pump wavelength λ is close to the signal laser wavelength, and a lower quantum loss can be obtained. In addition, in some embodiments, tuning the wavelength λ of the pump light outputted from the semiconductor pump laser 10 in the left-wing pump region L can effectively reduce the manufacture difficulty of the film of the dichroic lens, and allow an easier high contrast separation between the pump light and the signal laser.

In an embodiment, the substrate material of the anisotropic laser crystal 50 is YVO4, YLiF4, YAlO3, or KGd(WO4), the doped ions of anisotropic laser crystal 50 are $Yb^{3+}$, $Nd^{3+}$, $Er^{3+}$, $Tm^{3+}$ or $Ho^{3+}$. The corresponding anisotropic laser crystal 50 can be prepared according to the π polarization direction absorption spectrum and σ polarization direction absorption spectrum needed and selecting the proper substrate material for ion doping. This simplifies the structure design of the resonant cavity 40.

In an embodiment, the anisotropic laser crystal 50 is an Ho: YLF crystal formed by cutting along a axis direction; doping concentration of $Ho^{3+}$ in Ho: YLF crystal is 0.5%; the length of Ho: YLF crystal is 2 cm, the cross-sectional dimension is 4 mm×4 mm. The output stability of the pump wavelength λ in the peak pump region F and the left pump region L will be tested with the laser light source device equipped with the Ho: YLF crystal as an example.

Specifically, the wavelength λ of the pump light outputted from the semiconductor pump laser 10 is tuned to 1940 nm (the linewidth is more than 10 nm). At this time, the wavelength λ of the pump light is in the peak region F of the absorption spectrum of the anisotropic laser crystal 50. When the wavelength λ is 1940 nm, the absorption cross-sectional area of π polarization direction is $0.986 \times 10^{-20}$ $cm^2$, the absorption cross-sectional area of σ polarization direction is $0.356 \times 10^{-20}$ $cm^2$, the difference between the absorption cross-sectional areas is over 64%. When the output power is 1.63 W (the absorption pump power is about 4.4 W), by changing the winding mode of the coupling optical fiber 20 to perform the disturbance test, the influence of disturbance on the output power can reach 0.5 W. Accordingly, the pump light wavelength λ outputted from the semiconductor pump laser 10 is tuned to 1905 nm (linewidth less than 1.5 nm). At this time, the pump light wavelength is in the left-wing pump region L in the absorption spectrum of the anisotropic laser crystal 50. When the wavelength λ is 1905 nm, the absorption cross-sectional area of π polarization direction is $0.186 \times 10^{-20}$ $cm^2$, the absorption cross-sectional area of σ polarization direction is $0.174 \times 10^{-20}$ $cm^2$, the difference between absorption cross-sectional areas is less than 6.5%. When the output power is 1.44 W (the absorption pump power is about 6.8 W), by changing the winding mode of the coupling optical fiber 20 to perform the disturbance test, the influence of disturbance on the output power is not more than 0.1 W. The stability of laser output is greatly improved.

In an embodiment, the semiconductor pump laser 10 is in optical communication with the coupling lens group 30 through a coupling optical fiber 20 such that the pump light outputted from the semiconductor pump laser 10 is coupled through the coupling optical fiber 20 and then inputted into the coupling lens group 30. The linewidth of the pump light is less than 2 nm, so the pumping effect is better.

The foregoing respective technical features involved in the respective embodiments can be combined arbitrarily, for brevity, not all possible combinations of the respective technical features in the foregoing embodiments are described, however, to the extent they have no collision with each other, the combination of the respective technical features shall be considered to be within the scope of the description.

The foregoing implementations are merely specific embodiments of the present disclosure, and are not intended to limit the protection scope of the present disclosure. It should be noted that any variation or replacement readily figured out by persons skilled in the art within the technical scope disclosed in the present disclosure shall all fall into the protection scope of the present disclosure. Therefore, the protection scope of the present disclosure shall be object to the protection scope of the claims.

What is claimed is:

1. An all-solid-state laser light source device, comprising: a semiconductor pump laser, a coupling optical fiber, a coupling lens group, and a resonant cavity, wherein the coupling optical fiber, the coupling lens group, and the resonant cavity are arranged in sequence along an optical path of laser;

wherein the resonant cavity is provided with an anisotropic laser crystal therein, an absorption spectrum of the anisotropic laser crystal comprises a $\pi$ polarization direction absorption spectrum and a $\sigma$ polarization direction absorption spectrum, wherein the $\pi$ polarization direction absorption spectrum and the $\sigma$ polarization direction absorption spectrum have a peak pump region, and a left-wing pump region or a right-wing pump region located on both sides of the peak pump region, and a pump light wavelength $\lambda$ outputted by the semiconductor pump laser is located in the left-wing pump region or the right-wing pump region.

2. The all-solid-state laser light source device according to claim 1, wherein the resonant cavity is a flat cavity, a flat concave cavity, a folded cavity, an annular cavity, or an unstable cavity.

3. The all-solid-state laser light source device according to claim 1, wherein a substrate material of the anisotropic laser crystal is $YVO_4$, $YLiF_4$, $YAlO_3$, or $KGd(WO_4)$.

4. The all-solid-state laser light source device according to claim 1, wherein doped ions of the anisotropic laser crystal are $Yb^{3+}$, $Nd^{3+}$, $Er^{3+}$, $Tm^{3+}$, or $Ho^{3+}$ ions.

5. The all-solid-state laser light source device according to claim 1, wherein the anisotropic laser crystal is a Ho: YLF crystal formed by cutting along an a axis direction.

6. The all-solid-state laser light source device according to claim 5, wherein a doping concentration of $Ho^{3+}$ in the Ho: YLF crystal is 0.5%.

7. The all-solid-state laser light source device according to claim 6, wherein the Ho: YLF crystal has a length of 2 cm and a cross-sectional dimension of 4 mm×4 mm.

8. The all-solid-state laser light source device according to claim 7, wherein the pump light wavelength $\lambda$ outputted by the semiconductor pump laser is 1905 nm.

9. The all-solid-state laser light source device according to claim 1, wherein the semiconductor pump laser is in optical communication with the coupling lens group through the coupling optical fiber, such that the pump light outputted from the semiconductor pump laser is coupled through the coupling optical fiber and then inputted into the coupling lens group.

10. The all-solid-state laser light source device according to claim 9, wherein a linewidth of the pump light is less than 2 nm.

* * * * *